(12) United States Patent
Aoyama et al.

(10) Patent No.: US 9,499,711 B2
(45) Date of Patent: Nov. 22, 2016

(54) TREATMENT LIQUID AND RECORDING METHOD

(71) Applicant: Seiko Epson Corporation, Tokyo (JP)

(72) Inventors: Tetsuya Aoyama, Shiojiri (JP); Akiko Kawase, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/669,512

(22) Filed: Mar. 26, 2015

(65) Prior Publication Data

US 2015/0274992 A1 Oct. 1, 2015

(30) Foreign Application Priority Data

Mar. 27, 2014 (JP) ................................. 2014-065325

(51) Int. Cl.
*B41J 2/015* (2006.01)
*C09D 11/54* (2014.01)
*C09D 11/38* (2014.01)

(52) U.S. Cl.
CPC ............... *C09D 11/54* (2013.01); *C09D 11/38* (2013.01)

(58) Field of Classification Search
None
See application file for complete search history.

(56) References Cited

U.S. PATENT DOCUMENTS

2013/0321525 A1* 12/2013 Fujii et al. ...................... 347/21
2014/0085376 A1* 3/2014 Kato et al. ...................... 347/33

FOREIGN PATENT DOCUMENTS

JP 2010-023266 A 2/2010
JP 2010-115854 A 5/2010

OTHER PUBLICATIONS

IARC Monographs on the Evaluation of Carcinogenic Risks to Humans; vol. 77; p. 350.*

* cited by examiner

*Primary Examiner* — Erica Lin
*Assistant Examiner* — Tracey McMillion
(74) *Attorney, Agent, or Firm* — Harness, Dickey & Pierce, P.L.C.

(57) ABSTRACT

There is provided a treatment liquid which is used in a recording method in which recording is performed using an ink for ink jet recording containing a coloring material on a non-absorbent recording medium, the treatment liquid contains water, a coagulant coagulating components of an ink, and two or more types of organic solvents, the organic compounds do not contain the coagulant, a surfactant, and a resin, when calculating the product of a log P value and the content (% by mass) included in the treatment liquid for each of the organic compounds, the summation is equal to or less than −10, and among the organic compounds, the content of a first organic compound of which the log P value is greater than 0 is 0.1% by mass to 10% by mass with respect to the total mass of the treatment liquid.

12 Claims, No Drawings

TREATMENT LIQUID AND RECORDING METHOD

BACKGROUND

1. Technical Field

The present invention relates to a treatment liquid and a recording method using the same.

2. Related Art

An ink jet recording method is a method in which printing is performed by discharging small droplets of ink from fine nozzle heads to be flown and by adhering the small droplets of ink on a recording medium such as paper. The method has a feature that images with a high-resolution and a high-quality image can be printed at a high speed using a relatively inexpensive apparatus. In an ink composition used in such an ink jet recording method, various components such as a coloring material, a resin, water, and an organic solvent are used according to a recording medium used.

In a case where an image is recorded using the ink composition for ink jet recording containing such a coloring material (in particular, a pigment), a technique of coagulating the component such as a pigment on a recording medium using a solution including a coagulant or the like is known from the viewpoint of improving the quality of an image.

For example, JP-A-2010-115854 describes that after a reaction ink containing water and a reactant (coagulant) such as a polyvalent metal salt is attached to an ink non-absorbent or low-absorbent recording medium, a color ink containing a colorant is attached thereto, and by the action of the reactant, an image having a high color density can be recorded. In addition, JP-A-2010-23266 describes that an image having a high color density can be recorded on a recording medium having an absorbing layer such as coated paper by attaching a reaction liquid containing water and a polyvalent metal salt and an ink composition containing a colorant or the like.

In the treatment liquid (reaction liquid) as described in JP-A-2010-115854 and JP-A-2010-23266, water is contained as a major medium in order to favorably dissolve or disperse the coagulant (reactant) included therein. However, water included in the treatment liquid significantly reduces wettability with respect to a recording medium not having ink absorbency such as a film, and therefore, there is a problem that the treatment liquid itself is repelled on the recording medium. Accordingly, even in the case of using the treatment liquid, the image quality of an ink composition containing a coloring material (colorant) cannot be sufficiently improved in some cases.

For example, when an organic solvent is added to the treatment liquid in order to solve such a problem, the wettability with respect to an ink non-absorbent recording medium can be improved in some cases. However, the coagulant included in the treatment liquid has a high solubility in water, and has a low solubility in an organic solvent in many cases. For this reason, depending on the properties of the organic solvent added to the treatment liquid, the coagulant is less likely to be dissolved in the treatment liquid, and preservation stability of the treatment liquid is reduced. In addition, when an organic solvent is added to the treatment liquid, with reduction of the content of water in the treatment liquid, the coagulant is less likely to be dissolved in the treatment liquid, and preservation stability of the treatment liquid is reduced.

SUMMARY

An advantage of some aspects of the invention is to provide a treatment liquid having excellent preservation stability and excellent wettability with respect to a non-absorbent recording medium, and a recording method using the same.

The invention can be realized as the following aspects or application examples.

Application Example 1

According to an aspect according to the invention, there is provided a treatment liquid which is used in a recording method in which recording is performed using an ink for ink jet recording containing a coloring material on a non-absorbent recording medium, the treatment liquid contains water, a coagulant coagulating components of an ink, and two or more types of organic compounds, the organic compounds do not contain the coagulant, a surfactant, and a resin, when calculating the product of a log P value and the content (% by mass) included in the treatment liquid for each of the organic compounds, the summation is equal to or less than $-10$, and among the organic compounds, the content of a first organic compound of which the log P value is greater than 0 is 0.1% by mass to 10% by mass with respect to the total mass of the treatment liquid.

Application Example 2

In the treatment liquid according to Application Example 1, when the treatment liquid is applied to the non-absorbent recording medium, the treatment liquid may be applied such that the attached amount of the coagulant included in the treatment liquid becomes 0.05 mmol/m$^2$ to 3 mmol/m$^2$.

Application Example 3

In the treatment liquid according to Application Examples 1 or 2, the content of the coagulant may be 0.5% by mass to 30% by mass with respect to the total mass of the treatment liquid.

Application Example 4

In the treatment liquid according to any one of Application Examples 1 to 3, the coagulant may be at least one type selected from a polyvalent metal salt, an organic acid, and an organic acid salt.

Application Example 5

In the treatment liquid according to any one of Application Examples 1 to 4, the content in the case of containing or not containing the organic compound which is a liquid under the condition of 25° C. and has a standard boiling point of equal to or higher than 290° C. may be equal to or less than 2% by mass with respect to the total mass of the treatment liquid.

Application Example 6

In the treatment liquid according to any one of Application Examples 1 to 5, the treatment liquid may be applied to the non-absorbent recording medium by an ink jet recording method.

Application Example 7

In the treatment liquid according to any one of Application Examples 1 to 6, the organic compound may be at least one type selected from alcohols, glycol ethers, a nitrogen-containing compound, saccharides, and amines.

Application Example 8

According to another aspect of the invention, there is provided a recording method in which recoding is performed using the treatment liquid according to any one of Application Examples 1 to 7 and an ink for ink jet recording containing a coloring material on a non-absorbent recording medium.

DESCRIPTION OF EXEMPLARY EMBODIMENTS

Hereinafter, the preferred embodiment of the invention will be described. The embodiment described below describes one example of the invention. In addition, the invention is not limited to the following embodiment and includes various modifications performed within the range without departing from the scope of the invention.

1. Treatment Liquid

The treatment liquid according to an embodiment of the invention is a treatment liquid which is used in a recording method in which recording is performed using an ink for ink jet recording containing a coloring material on a non-absorbent recording medium, the treatment liquid contains water, a coagulant, and at least two or more types of organic compounds, the organic compounds do not contain the coagulant, a surfactant, and a resin, when calculating the product of a log P value and the content (% by mass) included in the treatment liquid for each of the organic compounds, the summation is equal to or less than −10, and among the organic compounds, the content of a first organic compound of which the log P value is greater than 0 is 0.1% by mass to 10% by mass with respect to the total mass of the treatment liquid.

Hereinafter, for the treatment liquid according to the embodiment, a composition of the treatment liquid, a composition of an ink for ink jet recording used in the recording method for applying the treatment liquid, and a recording medium to which the treatment liquid is applied will be described in this order.

1.1. Composition of Treatment Liquid
1.1.1. Coagulant

The treatment liquid according to the embodiment contains a coagulant which coagulates the components of an ink. The coagulant has a function of coagulating a coloring material by a reaction of a coloring material included in an ink and components such as a pigment dispersion and a resin which can be included in the ink. For this reason, as a result that by bringing the treatment liquid into contact with the coagulant on the recording medium, the ink attached to the recording medium is thickened or the color material included in the ink is insolubilized, it is possible to improve the coloring properties or the like of an image recorded with the ink, or it is possible to suppress occurrence of printing unevenness.

Examples of the coagulant, which are not particularly limited, include a polyvalent metal salt, an organic acid, an organic acid salt, and a cationic compound, and as the cationic compound, a cationic resin or a cationic surfactant can be used. Among these components, at least one type selected from a polyvalent metal salt, an organic acid, or an organic acid salt is preferably used from the viewpoint of excellent reactivity with components included in the ink.

The polyvalent metal salt is a compound constituted of a bivalent or higher metal ion and anions. Examples of the bivalent or higher metal ion include a calcium ion, a magnesium ion, a copper, nickel ion, a zinc ion, a barium ion, an aluminum ion, a titanium ion, a strontium ion, a chromium ion, a cobalt ion, and an iron ion. Among these metal ions constituting the polyvalent metal salt, at least one of a calcium ion and a magnesium ion is preferable from the viewpoint of excellent cohesion of a coloring material or the like.

The anion constituting the polyvalent metal salt is an inorganic ion. That is, the polyvalent metal salt in the invention is a salt constituted of an inorganic ion and a polyvalent metal. Examples of such an inorganic ion include a chlorine ion, a bromine ion, an iodide ion, a nitrate ion, a sulfate ion, and a hydroxide ion.

Specific examples of the polyvalent metal salt include calcium chloride, calcium nitrate, calcium sulfate, calcium hydroxide, magnesium chloride, magnesium sulfate, magnesium carbonate, barium sulfate, barium chloride, zinc sulfide, and copper nitrate. These polyvalent metal salts may be used alone or two or more kinds may be used in combination.

Examples of the organic acid include sulfonic acid, polyacrylic acid, acetic acid, glycolic acid, malonic acid, malic acid, maleic acid, ascorbic acid, succinic acid, glutaric acid, fumaric acid, citric acid, tartaric acid, lactic acid, pyrrolidone carboxylic acid, pyrone carboxylic acid, pyrrole carboxylic acid, furancarboxylic acid, pyridine carboxylic acid, coumaric acid, thiophene carboxylic acid, nicotinic acid, and derivatives of these compounds. These organic acids may be used alone or two or more kinds may be used in combination.

The organic acid salt is a salt of the above-described organic acid, and in the invention, the polyvalent metal salt of an organic acid includes in the organic acid salt. Examples the organic acid salt include a salt constituted of a monovalent metal ion (lithium ion, sodium ion, or potassium ion) and an organic acid and a salt constituted of a bivalent or higher metal ion described above and an organic acid. Specific examples of such an organic acid salt include sodium acetate, calcium acetate, and calcium lactate.

Examples of the cationic resin include a cationic urethane resin, a cationic olefin resin, and a cationic allyl amine resin.

As the cationic urethane resin, known cationic urethane resins can be suitably selected and used. As the cationic urethane resin, commercially available products can be used, and for example, HYDRAN CP-7010, CP-7020, CP-7030, CP-7040, CP-7050, CP-7060, and CP-7610 (trade name, manufactured by DIC Corporation), Superflex 600, 610, 620, 630, 640, and 650 (trade name, manufactured by Dai-ichi Kogyo Seiyaku Co., Ltd.), and urethane emulsion WBR-2120C and WBR-2122C (trade name, manufactured by TAISEI FINE CHEMICAL CO., LTD.) can be used.

The cationic olefin resin has an olefin such ethylene or propylene in a structure skeleton, and known cationic olefin resins can be suitably selected and used. In addition, the cationic olefin resin may be in an emulsion state in which the cationic olefin resin is dispersed in a solvent including water or an organic solvent. As the cationic olefin resin, commercially available products can be used, and examples thereof include ARROW BASE CB-1200 and CD-1200 (trade name, manufactured by UNITIKA LTD.).

As the cationic allyl amine-based resin, known cationic allyl amine-based resins can be suitably selected and used, and examples thereof include polyallyl amine hydrochloride, polyallyl amine amidsulfate, an allyl amine hydrochloride-diallyl amine hydrochloride copolymer, an allyl amine acetate-diallyl amine acetate copolymer, an allyl amine acetate-diallyl amine acetate copolymer, an allyl amine hydrochloride-dimethyl allyl amine hydrochloride copolymer, an allyl amine-dimethyl allyl amine copolymer, polydiallyl amine hydrochloride, polymethyl diallyl amine hydrochloride, polymethyl diallyl amine amidosulfate, polymethyl diallyl amine acetate, polydiallyl dimethyl ammonium chloride, a diallyl amine acetate-sulfur dioxide copolymer, a diallyl methyl ethyl ammonium ethyl sulfate-sulfur dioxide copolymer, a methyl diallyl amine hydrochloride-sulfur dioxide copolymer, a diallyl dimethyl ammonium chloride-sulfur dioxide copolymer, and a diallyl dimethyl ammonium chloride-acrylamide copolymer. As such a cationic allyl amine-based resin, commercially available products can be used, and for example, PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, PAS-J-81 (trade name, manufactured by NITTOBO MEDICAL CO., LTD.), Hymo Neo-600, Hymoloc Q-101, Q-311, Q-501, Himax SC-505, or SC-505 (trade name, manufactured by HYMO Co., Ltd.) can be used.

Examples of the cationic surfactant include a primary, a secondary, and a tertiary amine salt type compound, an alkyl amine salt, a dialkyl amine salt, an aliphatic amine salt, a benzalkonium salt, a quaternary ammonium salt, a quaternary alkyl ammonium salt, an alkyl pyridinium salt, a sulfonium salt, a phosphonium salt, an onium salt, and an imidazolinium salt. Specific examples thereof include a hydrochloride and an acetate of lauryl amine, coconut amine, or rosin amine, lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyl lauryl ammonium hydrochloride, cetyl pyridinium chloride, cetyl pyridinium bromide, dihydroxy ethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, and octadecyl dimethyl ammonium chloride.

The content of the coagulant is preferably 0.5% by mass to 30% by mass, and more preferably 1% by mass to 25% by mass with respect to the total mass of the treatment liquid. When the content of the coagulant is equal to or greater than 0.5% by mass, a function in which the coagulant coagulates the components included in an ink is further improved. In addition, when the content of the coagulant is equal to or less than 30% by mass, the solubility of the coagulant in the treatment liquid becomes favorable, and the storage stability of the treatment liquid can be improved.

The concentration of the coagulant included in the treatment liquid is preferably 0.05 mol/kg to 1.3 mol/kg, and more preferably 0.05 mol/kg to 1.0 mol/kg. When the concentration of the coagulant is equal to or greater than 0.05 mol/kg, a function in which the coagulant coagulates the components included in an ink is further improved. In addition, when the concentration of the coagulant is equal to or less than 1.3 mol/kg, the solubility of the coagulant in the treatment liquid becomes favorable, and the storage stability of the treatment liquid can be improved. Moreover, in the invention, the concentration of the coagulant included in the treatment liquid [mol/kg] is calculated by dividing the substance amount [mol] of the coagulant included in the treatment liquid by the total mass (that is, also including the polyvalent metal salt) of the treatment liquid.

When the treatment liquid is applied to a non-absorbent recording medium (described later), the treatment liquid is preferably applied such that the attached amount of the coagulant contained in the treatment liquid becomes 0.05 mmol/m$^2$ to 3 mmol/m$^2$, and more preferably applied such that the attached amount of the coagulant contained in the treatment liquid becomes 0.05 mmol/m$^2$ to 2.5 mmol/m$^2$. When the treatment liquid is applied such that the attached amount of the coagulant becomes equal to or greater than 0.05 mmol/m$^2$, coagulation of a coloring material can be promoted, and image quality to be recorded becomes favorable. In addition, when the treatment liquid is applied such that the attached amount of the coagulant becomes equal to or less than 3.0 mmol/m$^2$, precipitation of the coagulant from a recording portion can be suppressed, and when the coated amount of the treatment liquid is decreased, the time for drying the treatment liquid can be shorten, and therefore, it is possible to increase the speed of recording.

Even in the case where the hydrophobicity of the organic compound included in the treatment liquid is high, from the viewpoint that the solubility of the coagulant in the treatment liquid becomes favorable, a coagulant of which the solubility with respect to 100 g of water at 25° C. is equal to or greater than 1 g is preferably used, and a coagulant of which the solubility is 3 g to 80 g is more preferably used.

1.1.2. Organic Compound

The treatment liquid according to the embodiment contains two or more types of organic compounds. The organic compound does not contain the above-described coagulant, a surfactant (described below), and a resin (described below), and has a function of improving the wettability of the treatment liquid with respect to a non-absorbent recording medium.

In the treatment liquid according to the embodiment, when calculating the product of a log P value and the content ($M_{log}$) included in the treatment liquid for each of the organic compounds, the summation ($\Sigma M_{log}$) is required to be equal to or less than $-10$ ($\Sigma M_{log} \leq -10$). The lower limit is preferably equal to or greater than $-20$ ($-20 \leq \Sigma M_{log}$), more preferably equal to or greater than $-19$, still more preferably equal to or greater than $-18$, and particularly preferably equal to or greater than $-17$. The upper limit is preferably equal to or less than $-11$, more preferably equal to or less than $-12$, and still more preferably equal to or less than $-13$.

For example, in the case where a treatment liquid containing three kinds of organic compounds of an organic compound A, an organic compound B, and an organic compound C, the summation ($M_{log}A + M_{log}B + M_{log}C$) of the product ($M_{log}A$) of the log P value of the organic compound A and the content (% by mass) of the organic compound A included in the treatment liquid, the product ($M_{log}B$) of the log P value of the organic compound B and the content (% by mass) of the organic compound B included in the treatment liquid, and the product ($M_{log}C$) of the log P value of the organic compound C and the content (% by mass) of the organic compound C included in the treatment liquid corresponds to $\Sigma M_{log}$.

Here, the "log P value" is an indicator representing the hydrophobicity of a compound. The log P value, in an octanol/water system, shows the proportion at which the solute in these two layers is distributed. That is, as the log P value of a solute is increased, the hydrophobicity is increased, and the solute is more readily dissolved in an octanol phase. In addition, that the log P values of two types of substance approximate to each other indicates that the hydrophobicities of the two types of substance are similar. The log P value, for example, can be obtained by a flask shaking method in which a solute and two types of solvent are actually put into a flask, and shaking is performed, or a HPLC method using high performance liquid chromatography (HPLC).

When the organic compound included in the treatment liquid satisfies the condition of $\Sigma M_{log} \leq -10$, the hydrophilicity of the treatment liquid is in a suitable range. Thus, the solubility of the coagulant in the treatment liquid becomes favorable, and the preservation stability of the treatment liquid is improved. In addition, when $\Sigma M_{log}$ is equal to or greater than $-20$ ($-20 \leq \Sigma M_{log}$), reduction in the wettability of the treatment liquid with respect to a non-absorbent recording medium can be suppressed in some cases. In contrast, when $\Sigma M_{log}$ is greater than $-10$ ($-10 \leq \Sigma M_{log}$), the coagulant in the treatment liquid cannot be favorably dissolved, and the preservation stability of the treatment liquid is reduced.

Among the organic compounds included in the treatment liquid according to the embodiment, the content of a first organic compound of which the log P value is greater than 0 is required to be 0.1% by mass to 10% by mass, and is preferably 1% by mass to 10% by mass with respect to the total mass of the treatment liquid. Moreover, in the case where the treatment liquid contains plural types of first organic compound, the content of the first organic compound in the invention refers to the total amount of plural types of first organic compound.

The first organic compound of which the log P value is greater than 0 has high hydrophobicity. For this reason, when the content of the first organic compound is in the above range, the wettability of the treatment liquid with respect to a non-absorbent recording medium is improved. In contrast, when the content of the first organic compound is equal to or less than 0.1% by mass, the wettability of the treatment liquid with respect to a non-absorbent recording medium is reduced, and when the content of the first organic compound is greater than 10% by mass, the treatment liquid loses the balace between hydrophilicity and hydrophobicity, and the preservation stability of the treatment liquid is reduced.

Although the first organic compound is required to have a log P value greater than 0 (0<log P), the log P value is preferably greater than 0 and equal to or less than 4 (0<log P≤4), and more preferably greater than 0 and equal to or less than 3 (0<log P≤3). When the log P of the first organic compound is greater than 0, the wettability with respect to a non-absorbent recording medium becomes excellent. In addition, when the log P value is equal to or less than 4, the preservation stability of the treatment liquid is further improved in some cases.

In the treatment liquid according to the embodiment, hydrophilicity can be maintained by using an organic compound having a specific $\Sigma M_{log}$ value, and the properties of hydrophobicity can also be exhibited by containing the first organic compound having a specific log P value. Thus, the balance between hydrophilicity and hydrophobicity of the treatment liquid becomes excellent, and therefore, it is possible to satisfy the preservation stability of the treatment liquid and the wettability with respect to a non-absorbent recording medium at a high level.

Examples of the above-described organic compound can include alcohols, glycol ethers, a nitrogen-containing compound, saccharides, and amines.

Specific examples of the alcohols include organic solvent such as alcohols (for example, methanol, ethanol, 1-propanol, isopropyl alcohol, 1-butanol, 2-butanol, 1-pentanol, and 2-pentanol), 1,2-alkane diols (for example, ethylene glycol, propylene glycol, 1,2-butanediol, 1,2-pentanediol, 1,2-hexanediol, 1,2-heptanediol, and 1,2-octanediol), polyol except for the 1,2-alkane diols (for example, diethylene glycol, dipropylene glycol, 1,3-propanediol, 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerin). These alcohols can be used alone or in a mixture of two or more kinds thereof.

Specific examples of the glycol ethers include organic solvents such as alkylene glycol monoether and alkylene glycol diether. The glycol ethers can be used alone or in a mixture of two or more kinds thereof.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monobutyl ether, propylene glycol monopropyl ether, dipropylene glycol monomethyl ether, dipropylene glycol monoethyl ether, dipropylene glycol monopropyl ether, dipropylene glycol monobutyl ether, and tripropylene glycol monobutyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

Examples of the nitrogen-containing compound include organic solvents such as pyrrolidone derivatives (N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like), ureas (urea, ethylene urea, tetramethyl urea, thiourea, 1,3-dimethyl-2-imidazolidinone, and the like), and betaines (trimethyl glycine, triethyl glycine, tripropyl glycine, triisopropyl glycine, N,N,N-trimethyl alanine, N,N,N-triethyl alanine, N,N,N-triisopropyl alanine, N,N,N-trimethyl methyl alanine, carnitine, acetyl carnitine, and the like).

Examples of the saccharides include glucose, mannose, fructose, ribose, xylose, arabinose, galactose, aldonic acid, glucitol (sorbitol), maltose, cellobiose, lactose, sucrose, trehalose, and maltotriose.

Examples of the amines include diethanolamine, triethanolamine, and triisopropanolamine. These components may be contained in the treatment agent as a pH adjusting agent.

Examples of the first organic compound of which the log P value is greater than 0 among the above organic compounds include diethylene glycol monohexyl ether (1.7), ethylene glycol monohexyl ether (1.7), dipropylene glycol monobutyl ether (1.5), 1,2-heptane diol (1.5), 1-pentanol (1.4), tripropylene glycol monobutyl ether (1.34), 1,2-octane diol (1.3), 2-pentanol (1.19), propylene glycol monobutyl ether (1.15), 1-butanol (0.88), 2-methyl pentane-2,4-diol (0.88), dipropylene glycol monopropyl ether (0.87), ethylene glycol monobutyl ether (0.83), dipropylene glycol dimethyl ether (0.81), 1,2-hexane diol (0.7), propylene glycol monopropyl ether (0.62), 2-butanol (0.6), diethylene glycol monobutyl ether (0.56), 1,4-butanediol (0.5), diethylene glycol diethyl ether (0.39), 1-propanol (0.34), propylene glycol monoethyl ether (0.3), isopropyl alcohol (0.28), 1,5-pentane diol (0.27), 3-methyl-1,3-butanediol (0.16), and triethylene glycol monobutyl ether (0.02). Moreover, the numerical values in parentheses represent the log P values.

The content (total amount) of the organic compound is preferably 5% by mass to 50% by mass, and more preferably 10% by mass to 40% by mass with respect to the total mass of the treatment liquid. When the content of the organic compound is in the above range, the solubility of the coagulant in the treatment liquid tends to become favorable.

In the case of containing or not containing an organic compound which is a liquid under the condition of 25° C. and has a standard boiling point of equal to or higher than 290° C., the content of the treatment liquid is preferably equal to or less than 2% by mass (more preferably equal to or less than 0.8% by mass) with respect to the total mass of the treatment liquid. Thus, the drying properties of the treatment liquid attached to a non-absorbent recording medium becomes favorable, or the adhesiveness of the treatment liquid with respect to a non-absorbent recording medium can be improved. Examples of the organic compound having the standard boiling point equal to or higher than 290° C. include glycerin and triethanolamine.

1.1.3. Water

The treatment liquid according to the embodiment contains water. Water functions as a main medium of the treatment liquid and is a component which is evaporated and dispersed by drying. The water is preferably water in which ionic impurities have been removed at most, such as pure water or ultrapure water including ion exchange water, ultrafiltration water, reverse osmosis water, or distilled water. In addition, when using water sterilized by irradiating with ultraviolet rays or adding hydrogen peroxide, it is possible to prevent generation of fungi or bacteria in the case where the treatment liquid is stored for a long period of time, and thus, using sterilized water is preferable.

From the viewpoint of increasing the solubility of a coagulant, the content of water included in the treatment liquid is preferably equal to or greater than 40% by mass, and more preferably 50% by mass to 90% by mass with respect to the total mass of the treatment liquid.

1.1.4. Other Components

The treatment liquid according to the embodiment may contain a resin, inorganic oxide particles, or a surfactant.

The resin functions as a so-called resin for fixing, which improves the adhesiveness of the treatment liquid attached to a non-absorbent recording medium. Examples of such a resin include known resins such as a urethane-based resin, an acrylic resin, a styrene acrylic resin, a fluorene-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, and an ethylene vinyl acetate-based resin. These resins may be used alone or in combination of two or more kinds thereof. In the case where the resin is contained, the content thereof can be 0.1% by mass to 20% by mass with respect to the total mass of the treatment liquid.

Examples of the inorganic oxide particles include cationic inorganic oxide particles, anionic inorganic oxide particles, and nonionic inorganic oxide particles. The cationic fine particles have a function of increasing coloring properties of an image to be recorded, and examples thereof include cationic fine particles in which a cationic group is introduced to silica, alumina, or titanium oxide. The anionic or cationic inorganic oxide particles have a function of improving the fixing properties of ink by forming a receiving layer of ink on a non-absorbent recording medium, and examples of the anionic inorganic oxide particles include a silica sol, a titania sol, a zirconia sol, and a vanadium oxide sol, and examples of the nonionic inorganic oxide particles include silica, alumina, and titanium oxide. In the case where the inorganic oxide fine particles are contained, the content thereof can be 0.01% by mass to 15% by mass with respect to the total mass of the treatment liquid.

A surfactant has a function of improving the wettability with respect to the recording medium by reducing surface tension. Among surfactants, for example, an acetylene glycol-based surfactant, a silicone-based surfactant, and a fluorine-based surfactant may be preferably used.

Examples of the acetylene glycol-based surfactant, which are not particularly limited, include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all are trade names, manufactured by Air Products and Chemicals Inc.); Olefin B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all are trade names, Nissin Chemicals Co., Ltd.); and Acetylenol E00, E00P, E40, and E100 (all are trade names, manufactured by Kawaken Fine Chemicals. Co., Ltd.).

As the silicone-based surfactant, which is not particularly limited, a polysiloxane-based compound is preferably exemplified. As the polysiloxane-based compound, which is not particularly limited, for example, polyether-modified organosiloxane is exemplified. Examples of the commercially available products of the polyether-modified organosiloxane include BYK-306, BYK-307, BYK-333, BYK-341, BYK-345, BYK-346, and BYK-348 (trade names, manufactured by BYK Co., Ltd.); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemicals Co., Ltd.).

As the fluorine-based surfactant, a fluorine-modified polymer is preferably used, and a specific example thereof include BYK-340 (manufactured by BYK Co., Ltd.).

In the case where the surfactant is contained, the content thereof can be 0.1% by mass to 1.5% by mass with respect to the total mass of the treatment liquid.

The treatment liquid according to the embodiment may include a pH adjusting agent, a preservative, a fungicide, an anticorrosive agent, or a chelating agent, if necessary.

1.2. Composition of Ink

The treatment liquid according to the embodiment is used in a recording method in which recording is performed on a non-absorbent recording medium using an ink for ink jet recording. Hereinafter, an example of the composition of an ink capable of being used together with the treatment liquid according to the embodiment will be described.

1.2.1. Coloring Material

The ink according to the embodiment contains a coloring material. As the coloring material, a pigment or an acidic dye can be preferably used from the viewpoint of excellent reactivity with the coagulant included in the above-described treatment liquid.

Among the pigments, examples of the inorganic pigment include carbon black, iron oxide, and titanium oxide. Examples of the carbon black, which are not particularly limited, include furnace black, lamp black, acetylene black and channel black (C. I. Pigment Black 7). In addition, examples of commercially available carbon black include No. 2300, 900, MCF88, No. 20B, No. 33, No. 40, No. 45, No. 52, MA7, MA8, MA100, and No. 2200B (all are trade names, manufactured by Mitsubishi Chemical Corporation), Color Black FW1, FW2, FW2V, FW18, FW200, 5150, 5160, 5170, Printex 35, U, V, 140U, Special Black 6, 5, 4A, 4, and 250 (all are trade names, manufactured by Degussa AG), Conductex SC, Raven 1255, 5750, 5250, 5000, 3500, 1255, and 700 (all are trade names, manufactured by Columbian Chemicals), and Regal 400R, 330R, 660R, Mogul L, Monarch 700, 800, 880, 900, 1000, 1100, 1300, 1400, and Elftex 12 (all are trade names, manufactured by Cabot Corporation).

Examples of the organic pigment include a quinacridone-based pigment, a quinacridonequinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perynone-based pigment, a quinophthalone-based pigment, an anthraquinone-based pigment, a thioindigo-based pigment, a benzimidazolone-based pigment, an isoindolinone-based pigment, an azomethine-based pigment, and an azo-based pigment. Specific examples of the organic pigment include the following.

Examples of the pigment used in a cyan ink include C. I. Pigment Blue 1, 2, 3, 15, 15:1, 15:2, 15:3, 15:4, 15:6, 15:34, 16, 18, 22, 60, 65, and 66, and C. I. Vat Blue 4 and 60.

Examples of the pigment used in a magenta ink include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264, and C. I. Pigment Violet 19, 23, 32, 33, 36, 38, 43, and 50.

Examples of the pigment used in a yellow ink include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213.

Moreover, as pigments used in inks having colors other than those described above, that is, inks such as a green ink or an orange ink, known pigments in the related art are exemplified. The pigments may be used alone or two or more kinds may be used in combination.

Examples of the acidic dye include an azo-based acidic dye, an anthraquinone-based acidic dye, a pyrazolone-based acidic dye, a phthalocyanine-based acidic dye, a xanthene-based acidic dye, an indigoid-based acidic dye, and a triphenylmethane-based acidic dye. Specific examples of the acidic dye include C. I. Acid Yellow 17, 23, 42, 44, 79, and 142, C. I. Acid Red 52, 80, 82, 249, 254, and 289, C. I. Acid Blue 9, 45, and 249, and C. I. Acid Black 1, 2, 24, and 94. The dyes may be used alone or two or more kinds may be used in combination.

The content of the coloring material, for example, can be 1% by mass to 20% by mass with respect to the total mass (100% by mass) of the ink.

In the case where a pigment is used as the coloring material, it is preferable that the pigment is stably dispersed and held in water. Examples of the method include a method of dispersing a pigment in a pigment dispersed resin such as a water-soluble resin and/or a water-dispersible resin (hereinafter, a pigment treated according to this method is also referred to as "resin-dispersed pigment"), a method of dispersing a pigment in a dispersant (hereinafter, a pigment treated according to this method is also referred to as "dispersant-dispersed pigment"), and a method chemically and physically introducing a hydrophilic functional group to the pigment particle surface and enabling the pigment to be dispersible and/or soluble in water without the resin or a dispersant (hereinafter, a pigment treated according to this method is also referred to as "surface treated pigment").

The ink composition according to the embodiment may use any of the resin-dispersed pigment, the dispersant-dispersed pigment, and the surface treated pigment, and these may be used in the form of a plurality of types mixed together according to necessity; however, it is preferable that the resin-dispersed pigment is contained.

Examples of the resin dispersant used in the resin-dispersed pigment include polyvinyl alcohols, polyacrylic acid, an acrylic acid-acrylonitrile copolymer, a vinyl acetate-acrylic acid ester copolymer, an acrylic acid-acrylic acid ester copolymer, a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, a styrene-maleic acid copolymer, a styrene-maleic anhydride copolymer, a vinyl naphthalene-acrylic acid copolymer, a vinyl naphthalene-maleic acid copolymer, a vinyl acetate-maleic acid ester copolymer, a vinyl acetate-crotonic acid copolymer, a vinyl acetate-acrylic acid copolymer and the like, and salts thereof. Among these, a copolymer of a monomer having a hydrophobic functional group and a monomer having a hydrophilic functional group, and a polymer formed from monomers having both the hydrophobic functional group and the hydrophilic functional group are preferable. As the form of the copolymer, it is possible to use any form of a random copolymer, a block copolymer, an alternating copolymer, and a graft copolymer.

Although the content ratio of the resin dispersant can be suitably selected depending on a pigment to be dispersed, the content ratio is preferably 5 parts by mass to 200 parts by mass, and more preferably 30 parts by mass to 120 parts by mass with respect to 100 parts by mass of the content of the pigment in the ink.

1.2.2. Resin

The ink according to the embodiment may contain a resin. The resin is a so-called resin for fixing having a function of improving the adhesiveness of the treatment liquid attached to a non-absorbent recording medium. Since as specific examples of such a resin, the resins exemplified in the description of the treatment liquid can be used, the description will not be repeated. In the case where the resin is contained, the content thereof (amount in terms of solid content) can be 1% by mass to 10% by mass with respect to the total mass of the ink.

1.2.3. Organic Solvent

The ink according to the embodiment may contain an organic solvent. The organic solvent has a function of improving the adhesiveness of the ink with respect to a non-absorbent recording medium, or suppressing drying of the head of an ink jet recording apparatus. Examples of the organic solvent include alcohols, glycol ethers, and pyrrolidone derivatives, and since as specific examples of these, the organic solvents exemplified in the description of the treatment liquid can be used, the description will not be repeated. The content of the organic solvent, which is not particularly limited, for example, can be 1% by mass to 40% by mass with respect to the total mass of the ink.

1.2.4. Water

The ink according to the embodiment contains water. Since waters which can be preferably used are the same as those exemplified in the description of the treatment liquid, the description will not be repeated. The content of water, for example, can be equal to or greater than 50% by mass with respect to the total mass of the ink.

1.2.5. Surfactant

The ink according to the embodiment may contain a surfactant. The surfactant has a function of improving the wettability with respect to a non-absorbent recording medium by reducing surface tension of the ink. Among surfactants, for example, an acetylene glycol-based surfactant, a silicone-based surfactant, and a fluorine-based surfactant may be preferably used. Since as specific examples of these surfactants, the same surfactants as those exemplified in the description of the treatment liquid can be used, the description will not be repeated. The content of the surfactant, which is not particularly limited, can be 0.1% by mass to 1.5% by mass with respect to the total mass of the ink.

1.2.6. Other Components

The ink composition according to the embodiment may contain a pH adjusting agent, a preservative, a fungicide, an anticorrosive agent, or a chelating agent, if necessary.

1.2.7. Physical Properties of Ink

The surface tension of the ink according to the embodiment at a temperature of 20° C. is preferably 20 mN/m to 40 mN/m, and more preferably 25 mN/m to 35 mN/m from the viewpoint of balance between the image quality and the reliability as the ink for ink jet recording. Moreover, the surface tension can be measured by checking the surface tension at the time of wetting a platinum plate with an ink in the environment of a temperature of 20° C. using an Automatic Surface Tension Analyzer CBVP-Z (trade name, manufactured by Kyowa Interface Science Co., Ltd.).

In addition, from the same viewpoints, the viscosity of the ink composition according to the embodiment at a temperature of 20° C. is preferably 3 mPa·s to 10 mPa·s, and more preferably 3 mPa·s to 8 mPa·s. Moreover, the measurement of the viscosity can be performed by measuring the viscosity in an environment of a temperature of 20° C. using a viscoelasticity tester MCR-300 (trade name, manufactured by Physica Co., Ltd.).

Here, in the case where the above-described treatment liquid is applied to a non-absorbent recording medium by an ink jet recording method, the treatment liquid preferably has the same physical properties as those of an ink for ink jet recording, and specifically, the treatment liquid can have the surface tension or the viscosity of the ink in the above-described ranges.

1.3. Recording Medium

The treatment liquid according to the embodiment is used in a recording method in which recording is performed on a non-absorbent recording medium using an ink for ink jet recording. Hereinafter, an example of the non-absorbent recording medium used together with the treatment liquid according to the embodiment will be described.

The non-absorbent recording medium according to the embodiment refers to a recording medium having the properties of not absorbing ink at all or hardly absorbing ink. Quantitatively, the non-absorbent recording medium refers to "a recording medium of which the water absorption amount from the start of contact to 30 msec$^{1/2}$ is equal to or less than 10 mL/m$^2$ in the Bristow method". The Bristow method is the most widely used method as a method of measuring a liquid absorption amount in a short time, and is also employed by the Japan Technical Association of the Pulp and Paper Industry (JAPAN TAPPI). The details of the testing method are described in the standard No. 51 "Paper and Cardboard—Liquid Absorbency Test Method—Bristow Method" of the "JAPAN TAPPI Paper and Pulp Test Method 2000 Edition". Examples of the recording medium having such properties of non-absorbability include a recording medium not having an ink receiving layer having ink absorbability on the recording surface, and a recording medium having a coating layer of ink non-absorbability on the recording surface.

Examples of the non-absorbent recording medium include plastic films not having an ink absorbing layer, base materials such as paper coated with a plastic, or to which a plastic film is attached. Examples of the plastic described here include polyvinyl chloride, polyethylene terephthalate, polycarbonate, polystyrene, polyurethane, polyethylene, and polypropylene.

2. Recording Method

In the recording method according to an embodiment of the invention, recording is performed on the above-described non-absorbent recording medium using the above-described treatment liquid and the above-described ink for ink jet recording.

As an aspect of such a recording method, an applying step of applying the treatment liquid and an ink composition for ink jet recording on the non-absorbent recording medium can be exemplified, and an image is formed by bringing the treatment liquid into contact with the ink on the non-absorbent recording medium. In the applying step, after an image recording step of recording an image constituted of ink on a recording medium, a treatment liquid applying step of attaching the treatment liquid on the image may be performed, however, from the viewpoint of improving the quality of an image to be recorded, it is preferable to perform the image recording step after the treatment liquid applying step. Hereinafter, as the applying step, the case of performing the image recording step after the treatment liquid applying step will be described in detail as an example.

Treatment Liquid Applying Step

As described above, in the applying step, it is preferable to perform the treatment liquid applying step of applying the treatment liquid to a region where an image is formed on a non-absorbent recording medium before the image recording step. As the method of applying the treatment liquid, for example, any method of a spin coating method, a spray coating method, a gravure roll coating method, a reverse roll coating method, a bar coating method, and an ink jet method can be used. Among these, the ink jet method (ink jet recording method) is preferably used. In the case where the ink jet method is used, the treatment liquid is attached on a non-absorbent recording medium by discharging liquid droplets of the treatment liquid from nozzles of a head for ink jet recording. Since the surface tension of the treatment liquid is easily set to a value suitable for the ink jet recording method by an organic compound included therein, the discharge stability when the treatment liquid is discharged from nozzles tends to become favorable.

A step of drying the treatment liquid applied to a recording medium may be performed before the image recording step and after the treatment liquid applying step. In this case, it is preferable to dry to the degree of stickiness not being felt when touching the treatment liquid attached to the recording medium. Although the drying step of the treatment liquid may be performed by natural drying, drying with heating is preferable from the viewpoint of improving the drying speed. In the case where the drying step of the treatment liquid is performed with heating, the heating method is not particularly limited, and examples thereof include a print heater mechanism for heating by bringing a recording medium into contact with a heat source, a mechanism for irradiating with an infrared ray or microwave (electromagnetic wave having a maximum wavelength of about 2,450 MHz), and a hot air drying mechanism using a dryer or the like.

Image Recording Step

In the applying step, the image recording step may be performed after the above-described treatment liquid applying step. The image recording step is a step of recording an image by attaching liquid droplets of an ink for ink jet recording to a region where the treatment liquid is applied after the above-described treatment liquid applying step. Thus, the coloring properties of an image to be recorded is improved by a reaction between a coloring material or the like included in the ink and a coagulant included in the treatment liquid.

The image recording step is a step of recording an image by discharging liquid droplets of the above-described ink from the nozzles of the head for the ink jet recording and bringing the liquid droplets into contact with the treatment liquid applied to the non-absorbent recording medium.

Examples of the method for discharging the ink or the treatment liquid from the nozzles of the head for ink jet recording include the following. Specifically, a method in which strong electric field is applied between a nozzle and an accelerating electrode placed in front of the nozzle, liquid droplets of ink is continuously discharged from the nozzle, a recording information signal is given to deflection electrodes during the liquid droplets of ink fly between the deflection electrodes, and thus, recoding is performed or a method of discharging in response to the recording information signal without deflecting the liquid droplets of ink (electrostatic suction method), a method in which a pressure is added to ink using a small pump, a nozzle is mechanically vibrated using a crystal oscillator or the like, and thus, liquid droplets of ink is forcibly discharged, a method in which a pressure and a recording information signal are applied to an ink using a piezoelectric element at the same time, and thus, liquid droplets of ink is discharged and recording is performed (piezo method), and a method in which an ink is heated and caused to bubble by minute electrodes in accordance with a recording information signal, and thus, liquid droplets of ink is discharged and recording is performed (thermal jet method) can be exemplified.

In the case of performing the image recording step or the above-described treatment liquid applying step by the ink jet recording method, any one of an ink jet recording apparatus equipped with a serial type recording head and an ink jet recording apparatus equipped with a line type recording head can be used. The ink jet recording apparatus equipped with a serial type recording head refers to an ink jet recording apparatus which performs recording by performing scans (passes) for discharging the ink plural times while relatively moving the recording head with respect to the recording medium. As the specific example of the serial type recording head, a serial type recording head in which a recording head is mounted on a carriage moving in the width direction (direction intersecting the transport direction of the recording medium) of the recording medium, and which discharges liquid droplets onto a recording medium by the movement of the recording head in accordance with the movement of the carriage can be exemplified. On the other hand, the ink jet recording apparatus equipped with a line type recording head is an ink jet recording apparatus which performs recording by performing a scan (pass) for discharging the ink one time while relatively moving the recording head with respect to the recording medium. As the specific example of the line type recording head, a line type recording head in which the recording head is more widely formed than the width of a recording medium, and the recording head discharges liquid droplets on the recording medium without being moved can be exemplified.

The recording method according to the embodiment may have a step of drying an image on a recording medium after the image recording step. In this case, it is preferable to dry to the degree of stickiness not being felt when touching the image attached to the recording medium. Although the drying step of the image may be performed by natural drying, the drying step may be drying with heating from the same viewpoint as that described in the case of drying the treatment liquid. Although the heating method of an image is not particularly limited, the same methods as those exemplified in the heating method of the treatment liquid can be used.

3. Examples

Hereinafter, the embodiments of the invention will be further specifically described with reference to examples, but the embodiments are not limited to these examples.

3.1. Preparation of Ink

Respective components are mixed so as to have the mixing proportion in Table 1, then, the mixture was stirred, and filtered with a membrane filter having a pore size of 10 µm, whereby an ink was prepared. In the preparation of the ink, a pigment dispersion containing a pigment, a pigment-dispersing resin, and water was prepared in advance, and the pigment dispersion and the rest of the components were mixed. The numerical values in Table 1 are on a % by mass basis, and the ion exchange water was added such that the total mass of the ink became 100% by mass. Moreover, in Table 1, the components described other than the compound names are as follows. In addition, the content of a pigment, a resin dispersant, or a resin for fixing in Table 1 is a value in terms of solid content.

Acrylic acid-acrylic acid ester copolymer (resin dispersant, weight average molecular weight: 25,000, glass transition temperature: 80° C., acid value: 180)

Styrene-acrylic acid copolymer (resin for fixing, weight average molecular weight: 50,000, acid value: 130, average particle diameter: 75 nm)

BYK-348 (trade name, manufactured by BYK Japan KK, silicone-based surfactant)

Olfine PD-002W (trade name, manufactured by Nissin Chemical Industry Co., Ltd., acetylene glycol-based surfactant)

TABLE 1

| Composition of ink | | Ink 1 |
|---|---|---|
| Coloring material | C.I. Pigment Blue 15:3 | 4 |
| Resin dispersion | Acrylic acid-acrylic acid ester copolymer | 2 |
| Resin for fixing | Styrene-acrylic acid ester copolymer | 2 |
| | 1,2-Hexanediol | 5 |
| | 2-Pyrrolidone | 5 |
| | Propylene glycol | 10 |
| Surfactant | BYK-348 | 0.6 |
| | Olfine PD-002W | 0.2 |
| Ion exchange water | | 71.2 |
| Total (% by mass) | | 100 |

3.2. Preparation of Treatment Liquid

Respective components are mixed so as to have the mixing proportion in Table 2, and the mixture was stirred, whereby treatment liquids according to Examples and Comparative Examples were obtained. Ion exchange water is added such that the total amount of the treatment liquid became 100% by mass. Moreover, in Table 2, the components described other than the compound names are as follows.

BYK-348 (trade name, manufactured by BYK Japan KK, silicone-based surfactant)

TABLE 2

| Composition of reaction liquid | | | Molecular weight of coagulant | Solubility of coagulant | logP value of organic compound | Standard boiling point of organic compound | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|---|---|---|---|
| Coagulant | Polyvalent metal salt (inorganic acid salt) | Magnesium sulfate hydrate | 246.47 | 41.5 | | | | | | | | | | | | | |
| | | Calcium nitrate tetrahydrate | 236.14 | 72.7 | | | | | | | | | | | | | |
| | Organic acid salt | Calcium acetate monohydrate | 176.18 | 28 | | | | | | | | | | | | | |
| | | Calcium lactate pentahydrate | 218.22 | 4.8 | | | 4 | 4 | 4 | 4 | 4 | 4 | 4 | 4 | 4 | 4 | 4 |
| | Organic acid | Citric acid | 192.124 | 73 | 0.28 | 82 | 10 | | | | | | | | | | |
| Organic compound | Alcohols | Isopropyl alcohol | | | 0.7 | 223 | | 10 | | | | | | | | | |
| | | 1,2-Hexanediol | | | 1.6 | 244 | | | | | | | | | | | |
| | | 2-Ethyl-1,3-hexane diol | | | | | | | | 0.1 | 3 | | 1 | | 10 | 10 | 10 |
| | | Propylene glycol | | | −0.92 | 189 | 15 | 15 | 15 | 15 | 15 | 15 | 15 | 15 | 15 | 15 | 15 |
| | | Glycerin | | | −1.76 | 290 | | | 10 | | | | | | | 2 | 1 |
| | Glycol ethers | Dipropylene glycol monopropyl ether | | | 0.6 | 212 | | | | | | | | 5 | | | |
| | | Triethylene glycol monoethyl ether | | | −2.75 | 256 | | | | | | | | | | | |
| | Nitrogen-containing compound | 2-Pyrrolidone | | | −0.85 | 245 | 5 | 5 | 5 | 5 | 5 | 5 | 5 | 5 | | 5 | 5 |
| | Amines | Triethanol amine | | | −1.59 | 335 | | | | | | | | | 1 | | 1 |
| Surfactant | | BYK-348 | | | | | 0.5 | 0.5 | 0.5 | 0.5 | 0.5 | 0.5 | 0.5 | 0.5 | 0.5 | 0.5 | 0.5 |
| Ion exchange water | | | | | | | 65.5 | 65.5 | 65.5 | 75.4 | 70.5 | 72.5 | 74.5 | 70.5 | 64.5 | 63.5 | 63.5 |
| Total (% by mass) | | | | | | | 100 | 100 | 100 | 100 | 100 | 100 | 100 | 100 | 100 | 100 | 100 |
| Total amount (% by mass) of organic compound (first organic compound) of logP >0 | | | | | | | 10 | 10 | 10 | 0.1 | 5 | 3 | 1 | 5 | 10 | 10 | 10 |
| Summation (ΣMlog) when calculating the product of a logP value and the content (Mlog) included in the treatment liquid for each of the organic compounds | | | | | | | −15.25 | −11.05 | −12.05 | −18.022 | −16.65 | −15.95 | −16.45 | −15.05 | −12.64 | −14.57 | −14.4 |
| Content (% by mass) of an organic compound having a standard boiling point of equal to or higher than 290° C. | | | | | | | 0 | 0 | 0 | 0 | 0 | 0 | 0 | 0 | 1 | 2 | 2 |
| Content (mol/kg) of coagulant | | | | | | | 0.18 | 0.18 | 0.18 | 0.18 | 0.18 | 0.18 | 0.18 | 0.18 | 0.18 | 0.18 | 0.18 |
| Evaluation result | Film wetability | | | | | | A | A | A | B | A | A | A | A | A | A | A |
| | Treatment liquid preservation stability | | | | | | A | B | B | A | A | A | A | A | B | B | B |
| | Drying properties of treatment liquid | | | | | | A | A | A | A | A | A | A | A | B | B | B |

TABLE 2-continued

| Composition of reaction liquid | | Molecular weight of coagulant | Solubility of coagulant | logP value of organic compound | point of organic compound | Ex. 12 | Ex. 13 | Ex. 14 | Ex. 15 | Ex. 16 | Ex. 17 | Com. Ex. 1 | Com. Ex. 2 | Com. Ex. 3 | Com. Ex. 4 | Com. Ex. 5 |
|---|---|---|---|---|---|---|---|---|---|---|---|---|---|---|---|---|
| Coagulant | Polyvalent metal salt (inorganic acid salt) | | | | | | | | | | | | | | | |
| | Magnesium sulfate hydrate | 246.47 | 41.5 | | | | | | | | | | | | | |
| | Calcium nitrate tetrahydrate | 236.14 | 72.7 | | | | 7 | 7 | | | 23 | | | | | |
| | Organic acid salt | | | | | | | | | | | | | | | |
| | Calcium acetate monohydrate | 176.18 | 28 | | | | | | 7 | | | | | | | |
| | Calcium lactate pentahydrate | 218.22 | 4.8 | | | 4 | | | | | | 4 | 4 | 4 | 4 | 4 |
| | Organic acid salt | | | | | | | | | | | | | | | |
| | Citric acid | 192.124 | 73 | | | | | | | 7 | | | | | | |
| Organic compound | Alcohols | | | | | | | | | | | | | | | |
| | Isopropyl alcohol | | | 0.28 | 82 | | 10 | 10 | 10 | 10 | | | | | | |
| | 1,2-Hexanediol | | | 0.7 | 223 | 10 | | | | | 10 | | 7 | 10 | | 12 |
| | 2-Ethyl-1,3-hexane diol | | | 1.6 | 244 | | | | | | | | | | | |
| | Propylene glycol | | | -0.92 | 189 | 15 | 15 | 15 | 15 | 15 | 15 | 15 | | 15 | 15 | 15 |
| | Glycerin | | | -1.76 | 290 | 5 | | | | | | | 15 | | | |
| | Glycol ethers | | | | | | | | | | | | | | | |
| | Dipropylene glycol monopropyl ether | | | 0.6 | 212 | | | | | | | | 7 | | | |
| | Triethylene glycol monoethyl ether | | | -2.75 | 256 | | | | | | | | | | 10 | |
| | Nitrogen-containing compound | | | | | | | | | | | | | | | |
| | 2-Pyrrolidone | | | -0.85 | 245 | 5 | 5 | 5 | 5 | 5 | 5 | 5 | 5 | 5 | 5 | 5 |
| | Amines | | | | | | | | | | | | | | | |
| | Triethanol amine | | | -1.59 | 335 | | | | | | | | | | | |
| Surfactant | BYK-348 | | | | | 0.5 | 0.5 | 0.5 | 0.5 | 0.5 | 0.5 | 0.5 | 0.5 | 0.5 | 0.5 | 0.5 |
| Ion exchange water | | | | | | 60.5 | 62.5 | 62.5 | 62.5 | 62.5 | 46.5 | 75.5 | 61.5 | 65.5 | 65.5 | 63.5 |
| Total (% by mass) | | | | | | 100 | 100 | 100 | 100 | 100 | 100 | 100 | 100 | 100 | 100 | 100 |
| Total amount (% by mass) of organic compound (first organic compound) of logP >0 | | | | | | 10 | 10 | 10 | 10 | 10 | 10 | 0 | 14 | 10 | 0 | 12 |
| Summation (ΣMlog) when calculating the product of a logP value and the content (Mlog) included in the treatment liquid for each of the organic compounds | | | | | | -19.85 | -15.25 | -15.25 | -15.25 | -15.25 | -11.05 | -18.05 | -21.55 | -2.05 | -45.55 | 1.15 |
| Content (% by mass) of an organic compound having a standard boiling point of equal to or higher than 290° C. | | | | | | 5 | 0 | 0 | 0 | 0 | 0 | 0 | 15 | 0 | 0 | 0 |
| Content (mol/kg) of coagulant | | | | | | 0.18 | 0.28 | 0.30 | 0.40 | 0.36 | 0.97 | 0.18 | 0.18 | 0.18 | 0.18 | 0.18 |
| Evaluation result | Film wetability | | | | | A | A | A | A | A | A | C | A | A | C | A |
| | Treatment liquid preservation stability | | | | | A | A | A | A | A | A | B | C | C | A | C |
| | Drying properties of treatment liquid | | | | | C | A | A | A | A | A | B | C | A | A | A |

3.3. Evaluation Test
3.1. Wettability of Film

In the evaluation test, a remodeled ink jet printer (trade name "SurePress L-4033A", manufactured by Seiko Epson Corporation) was used, and the treatment liquid and the ink could be supplied to the printer. Specifically, any of the treatment liquids of Examples and Comparative Examples was discharged to a recording medium (trade name "OPP60 PAT1E 8K", manufactured by LINTEC Corporation, polypropylene film) fixed to a printing stage from the nozzles of the recording head with the nozzle pitch per one ink of the head of 720 dpi under the conditions of a recording resolution of 720 dpi×720 dpi, 1 pass, and full beta, and was applied such that the attached amount of coagulant included in the treatment liquid became 0.5 mmol/m². Then, a drying treatment of the recorded matter was performed by allowing the recorded matter to stand at 60° C. for 2 minutes in a dryer.

Next, letters having a size of 5 points and a solid image were recorded under the conditions of a recording resolution of 1,200 dpi×1,200 dpi and a multipath, and the recorded matter was naturally dried (temperature of 20° C., relative humidity of 65RH %) until the stickiness of the recorded matter disappeared. Moreover, the attached amount of ink before drying with respect to the recording medium was set to 11.5 mg/inch².

For the recorded matter obtained in this manner, the states of the letters and images were visually observed, and evaluation was performed according to the following evaluation criteria. The results of the evaluation tests are shown in Table 2.

C: Letter portion could not be recognized as letters, and repelling or unevenness in a solid image was severe. It is considered that unevenness occurs by repellence of the treatment liquid, due to this, the ink cannot uniformly react, and thus, cissing or unevenness occurs.

B: Letters could be recognized, however, repelling or unevenness occurred in a solid image. The cause is the same as in the evaluation of the "C".

A: Letters could also be recognized, and there was no repelling or unevenness even in a solid image.

3.2. Preservation Stability of Treatment Liquid 30 g of the treatment liquid obtained in the above-described manner was put into a sample bottle, followed by allowing the treatment liquid to stand at low temperature (0° C.), room temperature (20° C.), and high temperature (60° C.), for a predetermined time respectively, and the change of the treatment liquid when returned to room temperature was observed. The evaluation criteria are as follows, and the evaluation results are shown in Table 2.

C: When allowing to stand at room temperature for 2 weeks, a layer separation or a precipitation of a coagulant occurred.

B: Although there was no problem at room temperature, when allowing to stand at high or low temperature for 2 weeks, a layer separation or a precipitation of a coagulant occurred.

A: Even in the case of allowing to stand for 2 weeks under any conditions, a layer separation or a precipitation of a coagulant did not occur.

3.3. Drying Properties of Treatment Liquid

In the evaluation of the above "Wettability of Film", while changing the drying time in the drying treatment after applying the treatment liquid, the dryness of the treatment liquid was checked by finger touch. The evaluation criteria are as follows, and the evaluation results are shown in Table 2.

C: Even in the case where the drying treatment was performed at 60° C. for equal to or longer than 30 minutes, the treatment liquid was attached to a finger.

B: Even in the case where the drying treatment was performed at 60° C. for 2 minutes to 10 minutes, the treatment liquid was not attached to a finger.

A: Even in the case where the drying treatment was performed at 60° C. for less than 2 minutes, the treatment liquid was not attached to a finger.

3.4. Evaluation Results

As shown in Table 2, it was found that the treatment liquid according to Examples has excellent preservation stability, and an image (letter) formed by using the treatment liquid and the ink has excellent wettability with respect to a film. From this, it was found that due to excellent wettability of the treatment liquid with respect to a film, cissing or unevenness of the image (letter) can be reduced. Moreover, it was found that the treatment liquid of Example 12 contained a large amount of organic compound having a boiling point equal to or higher than 290° C., and therefore, the drying properties was reduced.

On the other hand, it was found that the treatment liquids of Comparative Examples 1 and 4 did not contain an organic compound having a log P value greater than 0, and therefore, the wettability with respect to a film was significantly reduced. In addition, it was found that the treatment liquid of Comparative Example 2 contained an organic compound having a log P value greater than 0 of greater than 10% by mass, and therefore, the hydrophobicity of treatment liquid became too high, and preservation stability of the treatment liquid was reduced, and the treatment liquid included a large amount of organic compound having a standard boiling point of equal to or higher than 290° C., and therefore, the drying properties was reduced. It was found that the treatment liquids of Comparative Examples 3 and 5 had the $\Sigma M_{log}$ value equal to or greater than $-10$, and therefore, the preservation stability of the treatment liquid was reduced.

Moreover, when a wettability test of a film using the treatment liquid of Comparative Example 4 was performed in the same manner except for using a low absorbent recording medium (trade name, "OK Top Coat N", manufactured by Oji Paper Co., Ltd., coated paper), cissing and unevenness of ink considered to be derived from cissing of the treatment liquid was not observed. Here, it was found that abrasion resistance or water resistance of the obtained image was reduced in the case of using coated paper. From this, it was found that in the case of using a non-absorbent recording medium such as a film, a recorded matter having high abrasion resistance and water resistance was obtained, however, since cissing of the treatment liquid tended to be likely to occur, using the treatment liquid of the application was particularly suitable.

The invention is not limited to the above-described embodiments and various modifications are possible. For example, the invention includes substantially the same configuration (for example, a configuration in which functions, methods, and results are the same or a configuration in which the purposes or effects are the same) as the configuration described in the embodiments. Further, the invention includes a configuration in which a part which is not substantial in the configuration described in the embodiments is replaced. Furthermore, the invention includes a configuration exerting the same operational effects as those of the configuration described in the embodiments or a configuration capable of implementing the same purposes as those of the configuration described in the embodiments. In addition, the invention includes a configuration made by adding a known technology to the configuration described in the embodiments.

The entire disclosure of Japanese Patent Application No. 2014-065325, filed Mar. 27, 2014 is expressly incorporated by reference herein.

What is claimed is:

1. A treatment liquid which is used in a recording method in which recording is performed using an ink for ink jet recording containing a coloring material on a non-absorbent recording medium, the treatment liquid comprising:
   water;
   a coagulant coagulating components of an ink; and
   two or more types of organic compounds,
   wherein the organic compounds do not contain the coagulant, a surfactant, and a resin,
   wherein when calculating the product of a log P value and the content (% by mass) included in the treatment liquid for each of the organic compounds, the summation is equal to or less than −10,
   wherein among the organic compounds, the content of a first organic compound of which the log P value is greater than 0 is 0.1% by mass to 10% by mass with respect to the total mass of the treatment liquid, and
   wherein when one of the organic compounds is a liquid under the condition of 25° C. and has a standard boiling point of equal to or higher than 290° C., a content thereof in the treatment liquid is equal to or less than 2% by mass with respect to the total mass of the treatment liquid.

2. The treatment liquid according to claim 1,
   wherein when the treatment liquid is applied to the non-absorbent recording medium, the treatment liquid is applied such that the attached amount of the coagulant included in the treatment liquid becomes 0.05 mmol/m$^2$ to 3 mmol/m$^2$.

3. A recording method,
   wherein recording is performed using the treatment liquid according to claim 2 and an ink for ink jet recording containing a coloring material.

4. The treatment liquid according to claim 1,
   wherein the content of the coagulant is 0.5% by mass to 30% by mass with respect to the total mass of the treatment liquid.

5. A recording method,
   wherein recording is performed using the treatment liquid according to claim 4 and an ink for ink jet recording containing a coloring material.

6. The treatment liquid according to claim 1,
   wherein the coagulant is at least one type selected from a polyvalent metal salt, an organic acid, and an organic acid salt.

7. A recording method,
   wherein recording is performed using the treatment liquid according to claim 6 and an ink for ink jet recording containing a coloring material.

8. The treatment liquid according to claim 1,
   wherein the treatment liquid is applied to the non-absorbent recording medium by an ink jet recording method.

9. A recording method,
   wherein recording is performed using the treatment liquid according to claim 8 and an ink for ink jet recording containing a coloring material.

10. The treatment liquid according to claim 1,
    wherein the organic compound is at least one type selected from alcohols, glycol ethers, a nitrogen-containing compound, saccharides, and amines.

11. A recording method,
    wherein recording is performed using the treatment liquid according to claim 10 and an ink for ink jet recording containing a coloring material.

12. A recording method,
    wherein recording is performed using the treatment liquid according to claim 1 and an ink for ink jet recording containing a coloring material.

* * * * *